US010754986B2

(12) United States Patent
Liggins et al.

(10) Patent No.: US 10,754,986 B2
(45) Date of Patent: Aug. 25, 2020

(54) COMMUNICATION DEVICE WITH SELECTIVELY SHARED ACCESS MODES AND INCOMING COMMUNICATION

(71) Applicant: COVER COMMUNICATIONS, LLC., Washington, DC (US)

(72) Inventors: William A. Liggins, Washington, DC (US); Clarence B. McCollum, West Bloomfield, MI (US); James H. Hill, Fishers, IN (US)

(73) Assignee: COVER COMMUNICATIONS, LLC., Washington, DC (US)

( * ) Notice: Subject to any disclaimer, the term of this patent is extended or adjusted under 35 U.S.C. 154(b) by 333 days.

(21) Appl. No.: 15/934,631

(22) Filed: Mar. 23, 2018

(65) Prior Publication Data
US 2018/0276413 A1 Sep. 27, 2018

Related U.S. Application Data

(60) Provisional application No. 62/476,231, filed on Mar. 24, 2017.

(51) Int. Cl.
*G06F 21/62* (2013.01)
*G06F 9/451* (2018.01)
*G06F 21/60* (2013.01)
*G06F 9/54* (2006.01)
*H04L 12/58* (2006.01)

(52) U.S. Cl.
CPC .......... *G06F 21/6254* (2013.01); *G06F 9/452* (2018.02); *G06F 9/543* (2013.01); *G06F 21/604* (2013.01); *G06F 21/629* (2013.01); *H04L 51/12* (2013.01); *G06F 9/451* (2018.02); *G06F 2221/2141* (2013.01); *H04L 51/00* (2013.01)

(58) Field of Classification Search
CPC .... G06F 21/6254; G06F 9/543; G06F 21/604; G06F 21/629; G06F 9/451; G06F 2221/2141; G06F 9/546; H04L 51/12; H04L 51/00
See application file for complete search history.

(56) References Cited

U.S. PATENT DOCUMENTS 8,699,998 B2 4/2014 Sprigg et al.
9,195,388 B2 11/2015 Shepherd et al.
(Continued)

*Primary Examiner* — Christopher C Harris
(74) *Attorney, Agent, or Firm* — Mannava & Kang, P.C.

(57) ABSTRACT

A communication device includes a memory to store a contact list, a communication, and tagged contacts and tagged communication form of the tagged contacts; a processor to receive an incoming communication transmitted to the communication device determine identification information from the incoming communication; and determine if the incoming communication meets a criterion for a third party user of the communication device to view the incoming communication. To determine if the incoming communication meets the criterion, the processor compares the determined identification information from the incoming communication to the tagged communication form of the tagged contacts. If the incoming communication meets the criterion, then the processor displays the incoming communication, and if the incoming communication does not meet the criterion, then the processor does not display the incoming communication.

17 Claims, 14 Drawing Sheets

(56) References Cited

U.S. PATENT DOCUMENTS

| | | | |
|---|---|---|---|
| 2011/0237221 A1* | 9/2011 | Prakash | H04L 63/20 455/411 |
| 2012/0154413 A1* | 6/2012 | Kim | G06F 21/6218 345/530 |
| 2012/0291101 A1* | 11/2012 | Ahlstrom | G06F 21/6218 726/4 |
| 2013/0305354 A1* | 11/2013 | King | G06F 21/31 726/19 |
| 2014/0113558 A1* | 4/2014 | Varoglu | H04W 12/08 455/41.2 |
| 2014/0136607 A1* | 5/2014 | Ou | H04L 67/18 709/203 |
| 2014/0143149 A1 | 5/2014 | Aissi | |
| 2014/0237378 A1* | 8/2014 | Gonen | H04M 1/72519 715/745 |
| 2014/0283135 A1* | 9/2014 | Shepherd | G06F 3/0482 726/29 |
| 2014/0283141 A1* | 9/2014 | Shepherd | G06F 3/0482 726/30 |
| 2014/0283142 A1* | 9/2014 | Shepherd | G06F 3/0482 726/30 |
| 2014/0344951 A1* | 11/2014 | Brewer | G06F 3/0488 726/28 |
| 2015/0213242 A1 | 7/2015 | Taylor | |
| 2015/0350215 A1* | 12/2015 | Shi | H04L 63/101 726/26 |
| 2016/0179334 A1* | 6/2016 | Fleizach | H04M 19/04 715/863 |
| 2016/0343237 A1* | 11/2016 | Herman | G08B 25/008 |

* cited by examiner

US 10,754,986 B2

COMMUNICATION DEVICE WITH SELECTIVELY SHARED ACCESS MODES AND INCOMING COMMUNICATION

CROSS-REFERENCE TO RELATED APPLICATION

This application claims the benefit of U.S. Provisional Application No. 62/476,231, filed on Mar. 24, 2017, the content of which is expressly incorporated herein by reference thereto.

FIELD OF THE INVENTION

The present disclosure generally relates to a communication device with selectively shared access modes. More specifically, embodiments of the present application relate to a communication device that allows selective access to a third party user.

BACKGROUND OF THE INVENTION

An owner of a communication device, such as a smart phone, may wish to allow a third party to access his communication device. This requires the owner to supply the third party with a password or passcode to the communication device. However, providing the password or passcode to the third party would allow the third party to have access to the contents of the communication device. This can cause problems if the communication device includes proprietary information or if the owner did not want the third party to have access to some of the information or applications on the device. Furthermore, having multiple copies of the same application is very resource intensive.

SUMMARY OF THE INVENTION

In an aspect, a communication device includes a memory to store a contact list, a communication, and tagged contacts and tagged communication form of the tagged contacts; a processor to receive an incoming communication transmitted to the communication device in order to determine identification information from the incoming communication; and determine if the incoming communication meets a criterion for a third party user of the communication device to view the incoming communication. To determine if the incoming communication meets the criterion, the processor compares the determined identification information from the incoming communication to the tagged communication form of the tagged contacts. If the incoming communication meets the criterion, then the processor displays the incoming communication, and if the incoming communication does not meet the criterion, then the processor does not display the incoming communication.

In another aspect a communication device includes a memory to store a primary layered environment and a pre-programmed secondary layered environment, including, for each of the layered environments, an approved communication form corresponding to at least one of an approved contact and/or an approved contact group. The communication device also includes a processor to receive an incoming communication transmitted to the communication device; determine identification information from the incoming communication; determine if the incoming communication meets a criterion for a third party user of the communication device to view the incoming communication. To determine if the incoming communication meets the criterion, the processor compares determined identification information from the incoming communication to the approved communication form. If the incoming communication meets the criterion, then the processor displays the incoming communication, and if the incoming communication does not meet the criterion, then the processor does not display the incoming communication.

In yet another aspect a communication device includes a memory to store a plurality of secondary layered environments, wherein each of the plurality of secondary layered environments can include a different communication enabled criteria and a different application criterion. The communication device can also include a processor to receive a first selection of the plurality of secondary layered environments stored in the memory, determine communication enabled criteria and application criteria associated with the first selection of the plurality of secondary layered environment, determine an enabled communication list associated with the communication enabled criteria for the first selection of the plurality of secondary layered environments, determine an active application list associated with the application criteria for the first selection of the plurality of secondary layered environments. The communication device can receive and/or send communications from and to a number of the enabled communication list, communicate with applications in the active application list. Furthermore, the communication device can include a screen to display the first selection of the plurality the secondary layered environments.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

BRIEF DESCRIPTION OF THE DRAWINGS

The present disclosure in its several aspects and embodiments can be more fully understood from the detailed description and the accompanying drawings, wherein.

Throughout this specification and figures like reference numbers identify like elements.

DETAILED DESCRIPTION OF THE INVENTION

Figure 1A:
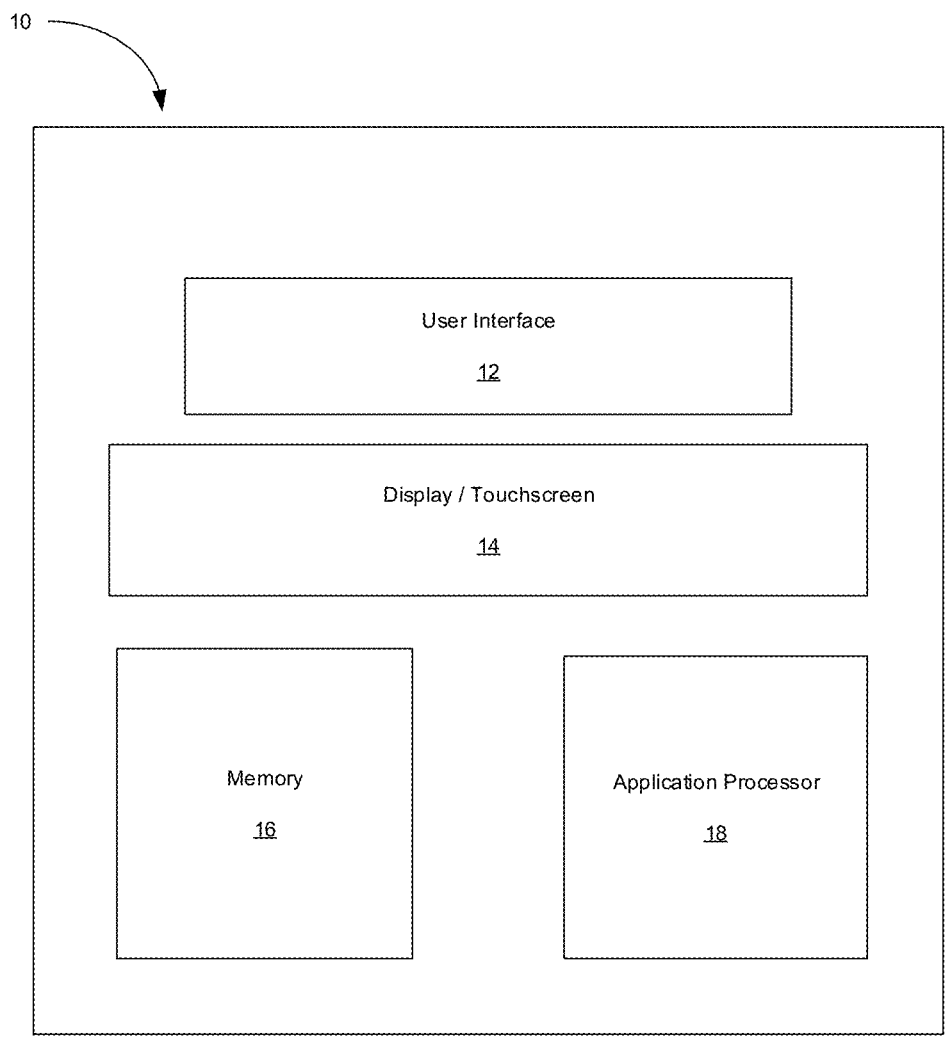
FIG. 1A is a block diagram of a communication device, according to an example of the present disclosure.

It is to be understood that both the foregoing general description and the following detailed description are by way of example, and are intended to provide an explanation of various embodiments of the present teachings.

In its broad and varied embodiments, disclosed herein is an apparatus, such as communication device that allows the owner/administrator of the communication device to restrict a third party user's access to a communication form and/or its application or software program.

Definitions

The term "application" as used herein refers to a software application that can run on a communication device. The term "application" also includes any type of information, file, or program that may include confidential, personal, or propriety information. Application also includes social media applications, such as TWITTER®, INSTAGRAM®, and FACEBOOK®, and credit card, debit card, or banking applications, such as GOOGLE WALLET™ or APPLE PAY™. Application also includes calendar, notepad, code, photos, television channels, phone numbers, phone calls, contact lists, call logs, voicemail, videos, music, documents, such as any credit card or banking documents, or any other confidential information, programs, files, and portions thereof.

The term "communication device" as used herein refers to any type of mobile device or electronic device that may be operated by a person, which may also provide remote communication capabilities to a network. The communication device can enable a person to download an application from a server via a communication network. One example of a communication device is a mobile phone that can execute mobile applications.

The term "communication," "incoming communication," or "communication form" as used herein refers to any form of written or oral communication, including, but not limited to, emails, text messages, SMS messages, phone conversation, and social media communications, such as TWITTER®, INSTAGRAM®, and FACEBOOK®, etc.

The term "identification information" includes any information that helps the system or the processor determine if there is a match between the incoming communication and the tagged or approved contact and communication form. This identification information can include, but not limited to, for example, the phone number, e-mail address, and the type of communication received by the communication device.

Overview

In an aspect, the communication device can include a plurality of layered environments (i.e., multiple access modes). For example, the communication device can include at least two layered environments, such as a primary layered environment and a secondary layered environment. The secondary layered environment can provide the communication device with different communication enabled criteria and different application criteria. Thus, the secondary layered environment can restrict the access of a third party user to certain applications, certain content in a particular application, and or more communication forms of the communication device. In an aspect, the primary layered environment can provide unfettered access to all of the communication device's communications and/or applications, while its secondary layered environment can provide limited access to the communication device's communications and/or applications. In other words, when the device is operated in its secondary layered environment, a third party user has access to a subset of applications and/or communications, but cannot access applications and/or send or receive communications that are restricted while the communication device is operating in the secondary layered environment.

FIG. 1A is a block diagram of a communication device 10 utilized with an embodiment of the present application. The communication device 10 can include at least a user interface 12, a display that can be a touchscreen display 14, a memory 16, and an applications processor 18. Those skilled in the pertinent art will recognize that other components may be present in a communication device 100 without departing from the scope and spirit on the present application. A security application/program that can include a content management program can be stored in a memory 16 of the communication device 10 and can interface with the application processor 18 of the communication device 10.

Figure 1B:
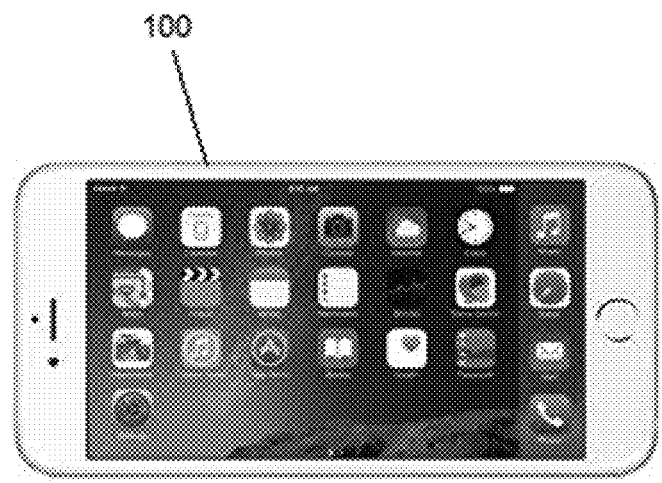
FIG. 1B is a communication device having a primary layered environment, according to an example of the present disclosure.
Figure 1C:
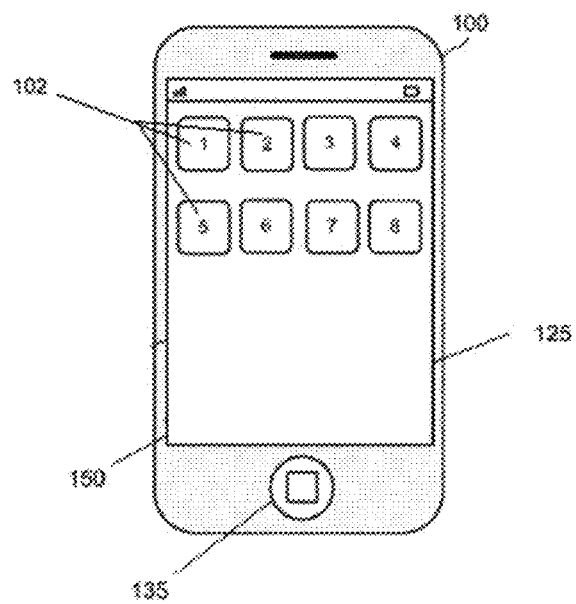
FIG. 1C is a communication device showing the screen that allows an owner of the communication device to switch between primary layered environment and plurality of secondary layered environments, according to an example of the present disclosure.
Figure 1D:
FIG. 1D is a communication device having a secondary layered environment, according to an example of the present disclosure.

In an aspect, as shown in FIG. 1B-1D, the communication device 100 can include a primary layered environment (FIG. 1B) and a secondary layered environment (FIG. 1D). A default layer can be setup by the owner, such that when the communication device 100 is first turned on, the default layer is the primary layered environment. However, the owner can also setup the communication device 100 such that the default layer is one of the secondary layered environments.

In an aspect, the owner can utilize the security program stored in the memory 16 to set up the secondary layered environment as well as setting up the default layer as the primary layered environment or as the secondary layered environment. Alternatively or optionally, the owner can set up the secondary layered environment as well as setting up the default layer as the primary layered environment or as the secondary layered environment using a desktop or any other devices that can connect to the Internet. When using the desktop or any other devices that can connect to the World Wide Web, the owner can simply log into his/her account to setup the desired parameters.

Referring to FIG. 1B, if the owner is handing the communication device 100 to a third party user, the owner or any authorized user can instruct the application processor 18 to activate the security program stored in the memory 16 using the touchscreen or display of the communication device 100. Once the security program has been activated, the owner can select one of the plurality of secondary layered environments. In the example shown in FIG. 1C, the system has been pre-programmed to include eight secondary layers 102. In an example, the first selection of the plurality of secondary layered environments (i.e., button 1) allows the third party user to only access games on the communication device 100. For example, this can be useful when the owner's children would like to borrow the communication device 100 to play a game. In another example, the second selection of the plurality of secondary layered environments (i.e., button 2) can be programmed to prevent the third party user to send a text. In this example, when the system detects that button 2 has been pressed or selected, the communication device 100 masks the text messaging icon on the communication device 100, as shown in FIG. 1D, so that the background image is shown instead of the text messaging icon. This can be useful when the owner's teenage kid would like to borrow the communication device 100 to play a game or make a phone call, but the owner does not want his teenage kid to text anyone because of charges associated with texting.

In yet another example, the third selection of the plurality of secondary layered environments (e.g., button 3) can allow a third party user to only make national phone calls. In this example, when the system detects that button 3 has been pressed, the communication device 100 can only show the phone dial buttons. Moreover, this layer may be programmed to prevent a third party user from dialing numbers "1" or "0" as the first number of the phone number to be dialed. This can prevent a third party user from making long distance or international calls. In yet another example, the fourth selection of the plurality of secondary layered environments (i.e., button 4) can allow a third party user to only receive calls from a particular phone number. In this example, when the owner presses button 4, the communication device 100 can only show a blank page. Once the communication device 100 receives a call from a particular phone number, an accept or decline button can appear on the blank page so that the user has the option to either accept or decline the received call from that particular phone number. Alternatively, when the communication device 100 receives a call from a particular phone number, only an accept button can appear on the blank page. Moreover, the secondary layered environment associated with button 4 can be programmed to disable the volume button. This can be particularly useful when a parent wants to get in touch with his/her child and the parent does not want to enable the child to ignore the parent's phone call. Thus, the phone will continue to ring at a pre-programmed volume until the child picks-up the phone. The owner can program other selections of the plurality of secondary layered environments associated with buttons 5-8 to limit different functions of the communication device 100.

In another example, one or more of the exemplary buttons 1-8 can be programmed, such that a third party user can only receive communications from a preselected number of people or groups of people in the contact list. For example, button 5 can be programmed, such that a child using the phone can only receive calls from a parent's cell, home, or work number. In another example, button 6 can be programmed, such that when a person hands his or her phone to his or her significant other, the significant other can only receive calls from a list of people in the contact list that are designated the status, for example, "friends or family" and not from the list of people in the contact list that are designated the status, for example, "colleague or co-worker." In these two examples, the third party user can freely initiate a communication. For example, if a child needs to call 911 or his/her friend to pick him/her up from school, the child can still call, text, or e-mail the desired person. However, in this example, the child must know the contact information of the person that he/she wants to contact, as the child will not have access to anyone's contact information, except his/her parents. In another example, button 7 can be programmed, such that web surfing icons (such as Internet Explorer icon) is not shown so that a child using the parent's phone is unable to surf the internet and stream and/or download contents from the web onto the communication device.

In one example, instead of selecting one of buttons 1-8 to select one of the plurality of secondary layered environments, a unique passcode can be associated with each of the programmed secondary layered environments. Thus, the owner, instead of going to a page to select a button associated with a particular secondary layered environment, can simply type-in a unique passcode associated with the desired secondary layered environment to activate the desired secondary layered environment.

In another example, instead of using a unique numerical or alphabetic passcode that is associated with each of the programmed secondary layered environments, the passcode can be in a form of a fingerprint, voice recognition, face recognition, iris scan, or other forms of passcode that can be associated with each of the programmed secondary layered environments. For example, if there are 10 secondary layered environments, a finger print of one of the fingers in the owner's hand can be associated with each of the 10 secondary layered environments.

Figure 2:
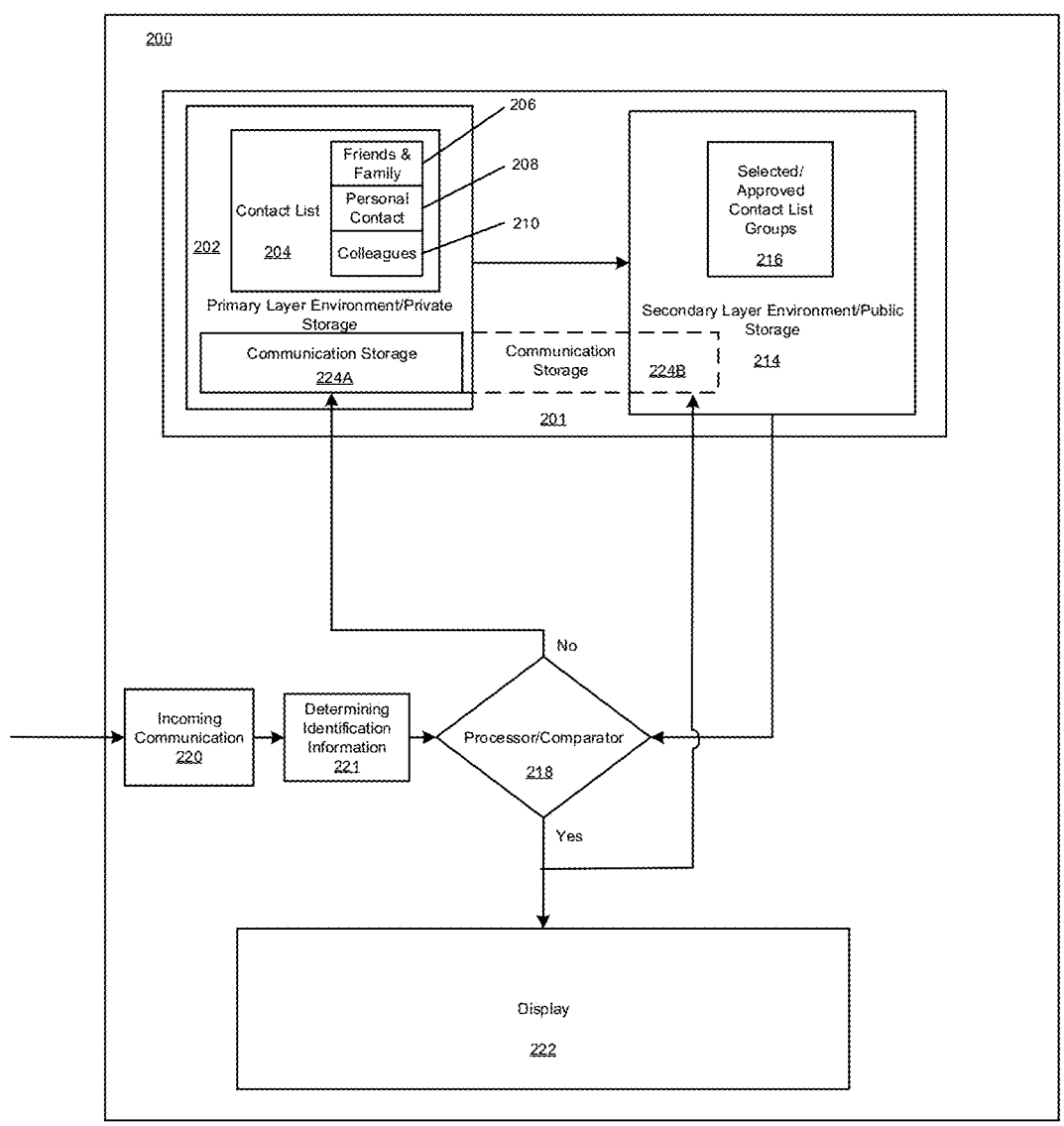
FIG. 2 is a block diagram of a communication device capable of receiving communications from a preselected group of contacts, according to an example of the present disclosure.

Limiting Incoming Communication to a Predetermined Number of Contacts in a Contact List A block diagram of a communication device capable of receiving communications from a pre-selected group of contacts (contact group) in a secondary layer is illustrated in FIG. 2. A communication device 200 can include a storage 201 having a private storage or primary layer environment 202 and a public storage or secondary layer environment/storage 214, a processor/comparator 218, and a display 222.

The primary layer environment 202 can include a contact list 204 inputted by the owner. Each contact can be categorized in one or more groups, such as friends and family group 206, personal contacts group 208, and colleagues group 210. In one example, a person can be in more than one group. For example, referring to FIG. 5B, Keli Angle can be part of the friends and family group 206, as well as, part of the personal contacts group 208.

Figure 5A:
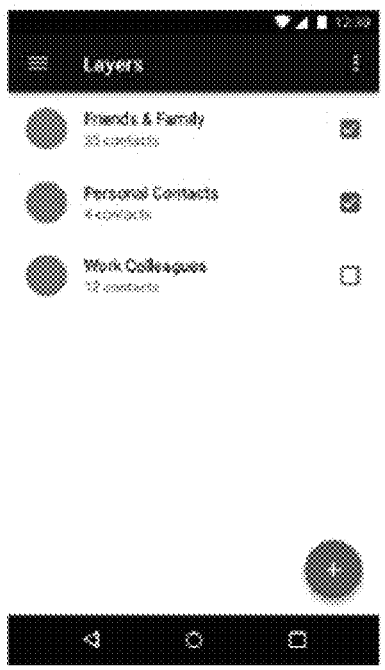
FIG. 5A is an exemplary contact list group page, where an owner of the communication device can select one or more group of contacts as approved contact list group, according to an example of the present disclosure.
Figure 5B:
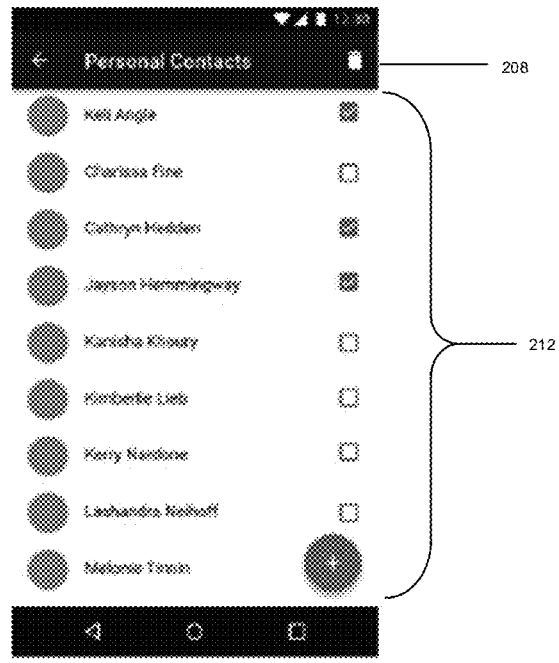
FIG. 5B is an exemplary contact list with in the contact list group page shown in FIG. 5A, according to an example of the present disclosure.

An exemplary contact list 204 having friends and family group 206, personal contacts group 208, and colleagues group 210 is shown in FIG. 5A. Each group can include one or more members. For example, as shown in FIG. 5B, the personal contacts group 208 can include multiple contacts/people 212. In one example, as shown in FIG. 5B, the owner of the communication device can select one or more contacts within each group so that the system can allow a third party user to view and receive a pre-selected communication form from the selected contacts.

Additionally, the owner of the communication device 200, by selecting a communication method, can allow the system to make the selected communication method for each of the selected contacts visible. Additionally, the system can allow the third party user to receive the pre-selected communication form from each selected contact. For example, referring to FIG. 5B, when the owner selects the contact "Keli Angle" and the communication form "text", the system allows the third party user to only be able to view existing and previously sent text messages from Keli Angle. Furthermore, when the owner selects the contact "Cathryn Hedden" and the communication form "text," "phone calls," and "e-mails", the system allows the third party user to only be able to view existing and sent text messages, phone calls, and e-mails and receive these communication form from Cathryn Hedden.

Referring back to FIG. 2, once the owner of the communication device 200 has selected the contact group and/or contacts whose communication can be viewed by a third party user of the communication device (approved contact list group 216), the system can create a copy of the approved contact list group 216 and place a copy of the approved contact list group 216 in the secondary layer environment 214. In one example, the selection process can be as easy as tagging the name and corresponding communication form in the contact list.

In an example, any approved communication form associated with the approved contact list group 216 can also be can be viewed by a third party user. This can be accomplished by copying and placing the approved contact list group 216 having the approved communication form on the secondary layer environment 214. For example, if the text messages from Keli Angle has been approved by the owner of the communication device 200 to be displayed and viewed by a third party user, then the third party user of the communication device 200 can see and/or review all or a pre-selected number of the text messages from Keli Angle. In another example, the system may not copy and place the communication forms associated with each person in the approved contact list group 216 on the secondary layer environment 214. Accordingly, a third party user can only see newly incoming approved form of communications associated with a person in the approved contact list group 216.

To determine if the system should notify a third party user of an incoming communication 220 and/or display the incoming communication 220, a processor can determine if the incoming communication meets a pre-determined criterion. To determine if the incoming communication meets the pre-determined criterion, the system, at 221, determines the identification information of the incoming communication. The identification information can include, but is not limited to, for example, the phone number, the e-mail address, and the type of communication that the incoming communication is coming from. The processor 218 can then compare the identification information from the incoming communication 220 to the approved contact list group 216, which includes the approved communication form.

If a match does not exist between the incoming communication 220 and the approved contact list group 216, then the criterion is not met and the incoming communication 220 can be stored in the communication storage 224A of the primary layer environment 202. This allows the owner of the communication device 200 to be able to view the incoming communication at a later time. If there is a match between the incoming communication 220 and the approved contact list group 216, then the criterion has been met and the incoming communication 220 can be stored in the communication storage 224B in the secondary layer environment and be displayed on the display 222. In this example, the owner of the communication device 200 can access both the communication storage 224A and 224B.

In an example, the secondary layer environment can be saved to be accessed quickly at a later time by entering an optional passcode. This option circumvents the owner to create the same secondary layer environment each time the owner wants to hand his/her phone to a third party user.

Figure 3:
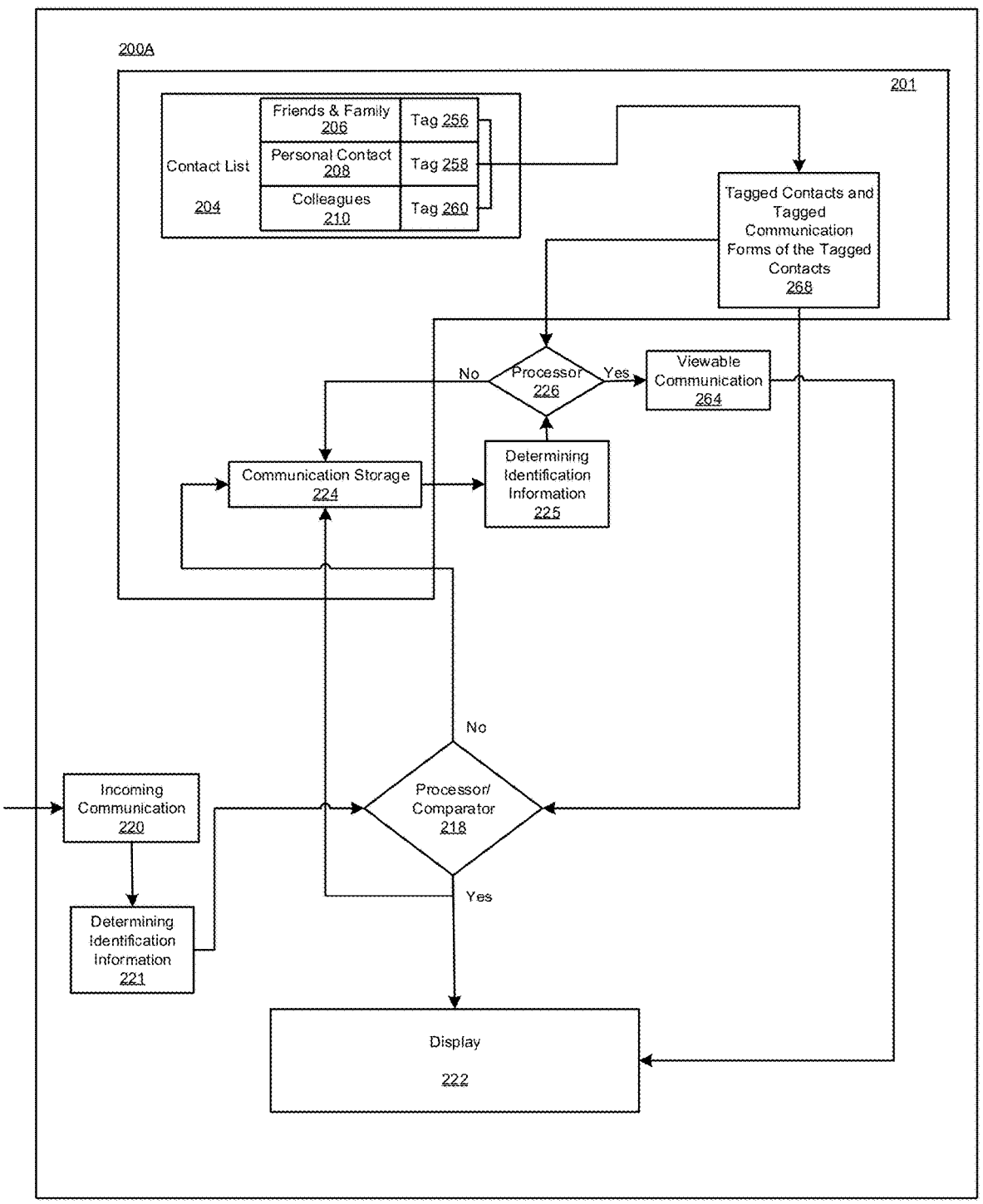
FIG. 3 is an alternative block diagram of a communication device capable of receiving communications from a preselected group of contacts, according to an example of the present disclosure.

In an alternative embodiment, the storage 201 may not include a primary layer environment/storage and a secondary layer environment/storage, but, as shown in FIG. 3, can include a single storage 201. In this example, the storage 201 can include a contact list 204 inputted by the owner. Each contact in the contact list can be categorized in one or more groups, such as friends and family group 206, personal contacts group 208, and colleagues group 210.

Referring to FIG. 3, the system allows the owner of the communication device 200A to tag one or more contact groups or one or more contacts within the contact group. For example, the system can allow the owner to tag all of the contacts and all of the communication forms under the friends and family group 206 for the system to create the tag contacts and communication forms 256. The owner can also tag all of the contacts, but only the text communication form under the personal contact group 208 for the system to create the tag contacts and communication forms 258. Additionally, the system can allow the owner to tag a selected number of contacts and only the e-mail and the voice communication forms under the colleagues group 210 for the system to create the tag contacts and communication forms 260. In this example, the tagged contacts and communication forms 256, 258, and 260 are contacts whose tagged communication forms can be viewed by a third party user of the communication device 200A. Additionally, the system can allow an incoming tagged communication form from the tagged contact to be displayed on the display 222 for a third party user to view.

To make previous communications of the tagged communication form of each tagged contact available for a third party user to view, the system determines the identification information of each communication stored in the communication storage 224. A processor 226 can then compare the identification information of all of the previously stored communications, stored in a communication storage 224, to the tagged communication forms of each of the tagged contacts. If the processor 226 does not find a match between the tagged communication forms and the communications stored in the communication storage 224, then those communications will remain hidden and will not be displayed for the third party user to view. However, if the processor 226 matches the tagged communication forms with the communications stored in the communication storage 224, then the matched stored communications become available as viewable communication 264. It is important to note that the owner of the communication device 200A has administrative access and can view all communications at all times.

To determine if the communication device 200A should notify a third party user and display an incoming communication 220, first, the system, at 221, determines the identification information of the incoming communication. A processor 218 can then determine if the incoming communication meets a pre-determined criterion. To determine if the incoming communication meets the pre-determined criterion, the processor 218 can compare the identification information from the incoming communication 220 to the tagged contacts and communication forms 268. If a match is not found, then the incoming communication 220 is forwarded to the communication storage 224 for the owner of the communication device 200A to be able to view at a later time. However, if there is a match, then the incoming communication 220 can be displayed on the display 222 and also be saved in the communication storage 224, where the processor 226 will determine that the third party user can access and view the saved communication.

Figure 4:
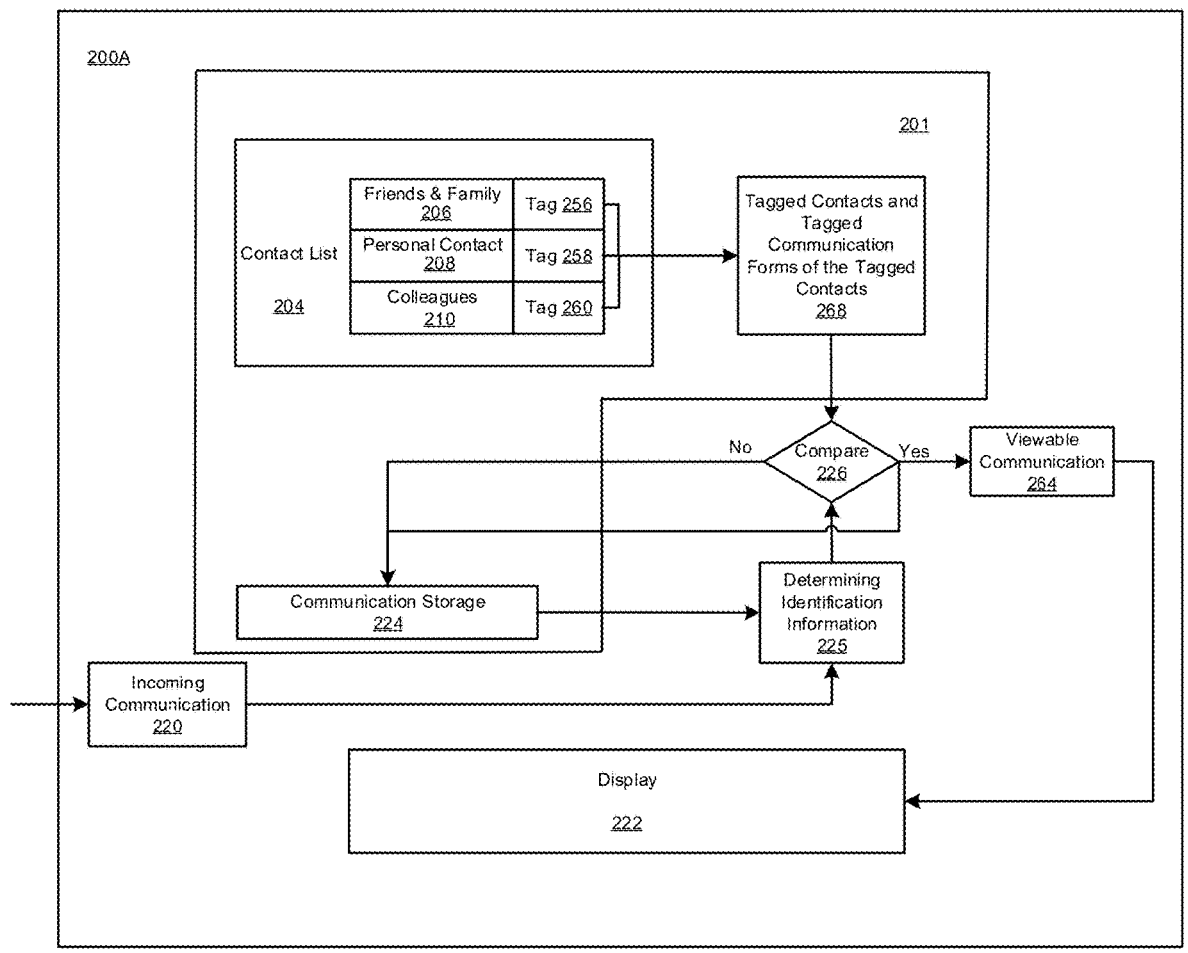
FIG. 4 is yet another alternative block diagram of a communication device capable of receiving communications from a preselected group of contacts, according to an example of the present disclosure.

Another alternative embodiment is shown in FIG. 4. This alternative embodiment is substantially similar to the embodiment shown in FIG. 3, except there is no need for the processor 218. In this alternative embodiment, at 225, the system determines the identification information of the incoming communication 220. The processor 226 can then compare the identification information from the incoming communication 220 to the tagged contacts and communication forms 268. If a match is found than the incoming communication 220 can be considered a viewable communication 264 by a third party user and can be displayed on display 222. Additionally, a copy of the incoming communication is saved in the communication storage 224. However, if the incoming communication 220 does not match the tagged contacts and tagged communication forms 268, then the incoming communication 220 can be stored in the communication storage 224, where only the owner of the communication device 200B, having administrative access, can view the stored incoming communication 220.

Figure 5C:
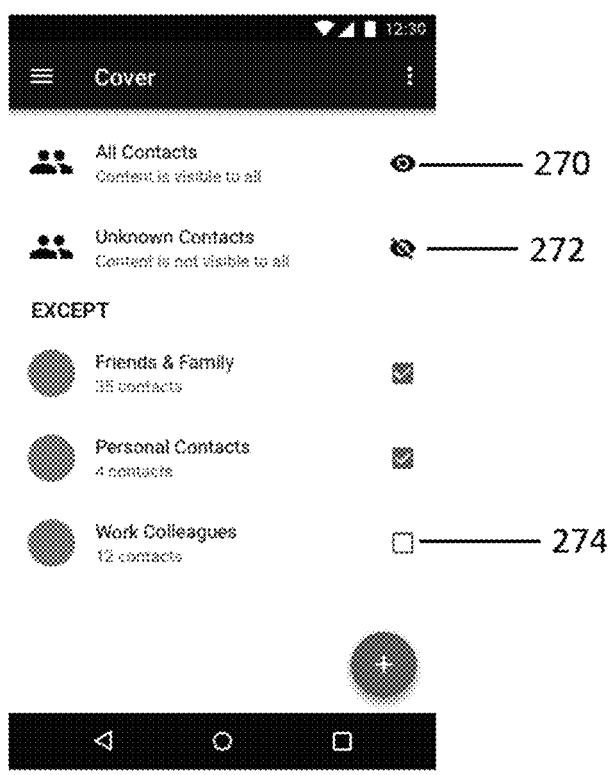
FIG. 5C is an alternative exemplary contact list group page, where all listed contacts are part of the approved contact list group, and an owner can un-tag one or more of the contacts to prevent a third party user to view the un-tagged contact information and incoming communications.

In another alternative embodiment, the system can allow all contacts and communication forms corresponding to each of the contacts be viewable unless the owner un-tags them as not being available or viewable. For example, as shown in FIG. 5C, at 270 all contacts in the communication device are visible to a third party. Additionally, as can be seen at 272, all incoming communications that are not part of the contact list are not visible to a third party. If the owner would like a third party to also not be able to see the communications coming from work colleagues, then the owner can un-tag the box 274 corresponding to the work colleagues and their corresponding incoming communications. Accordingly, FIGS. 2-4 apply equally to this alternative embodiment. In another embodiment, not shown in the figures, the un-tagging corresponds to the communications from the list of contact that can be seen by a third party.

Steps Involved in Selecting or Tagging a Contact

Figure 6:
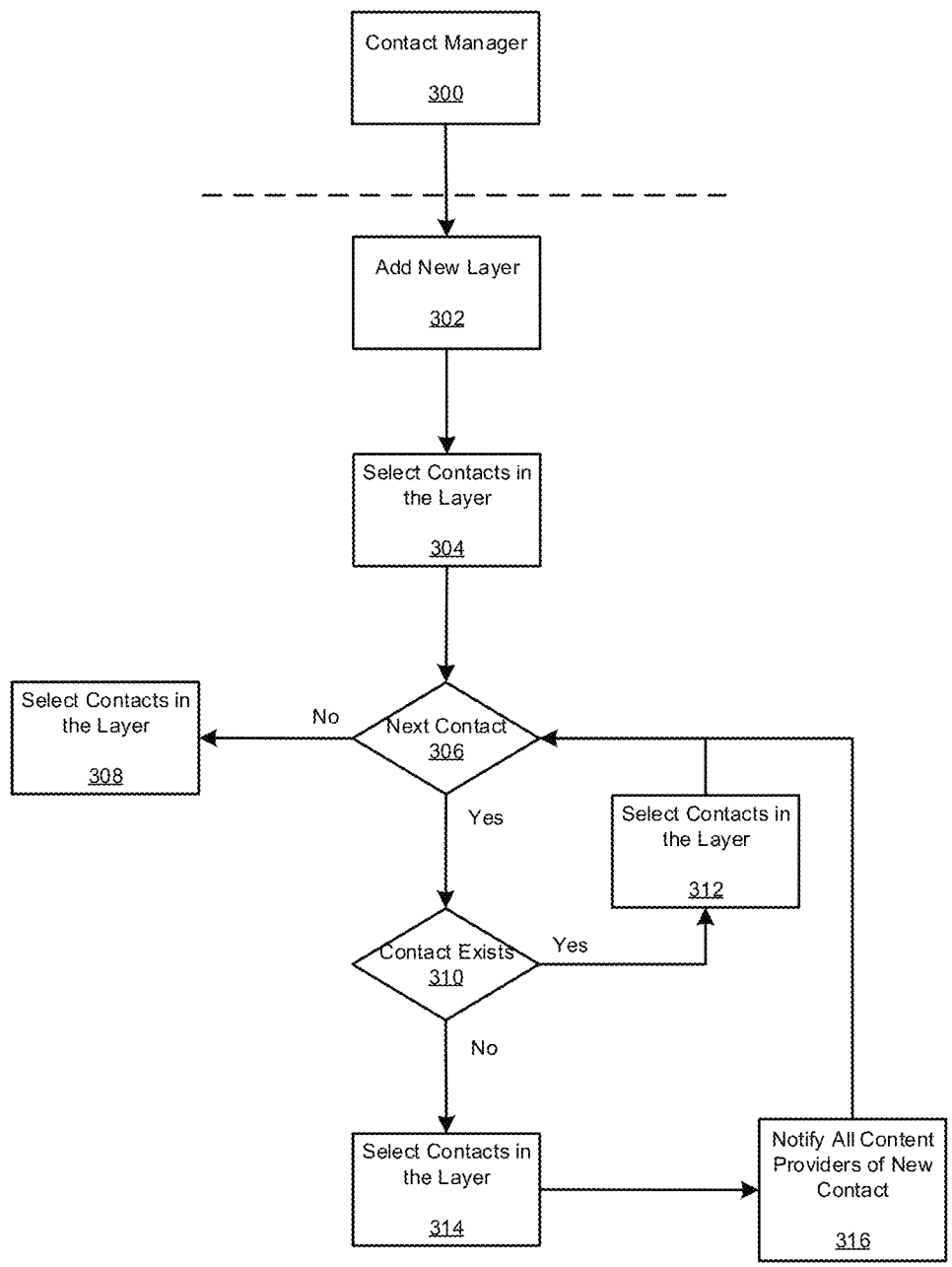
FIG. 6 is a flowchart relating to enabling a third party user to view a contact and communication form, according to an example of the present disclosure.
Figure 7:
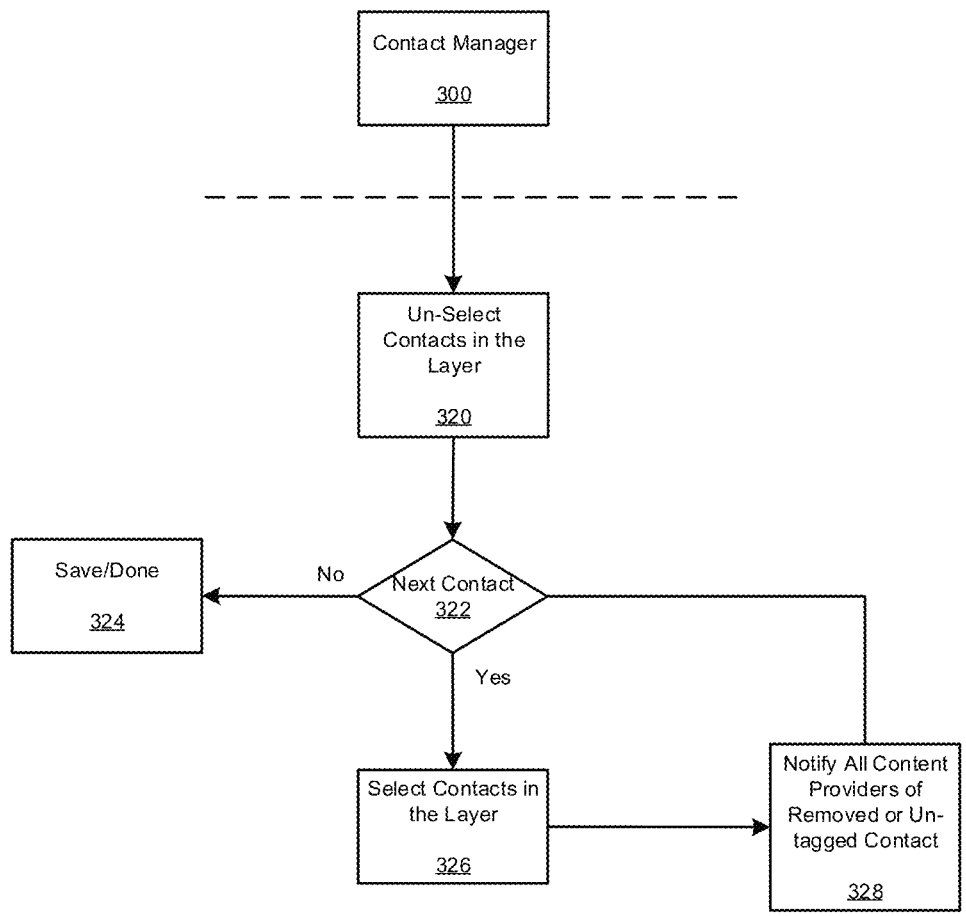
FIG. 7 is a flowchart relating to preventing a third party viewer to see a contact and communication form, according to an example of the present disclosure.

FIG. 6 illustrates a method for tagging or adding a contact or a contact group, to communication device 200A shown in FIGS. 3 and 4 or adding a contact or contact group to a secondary layer environment shown in FIG. 2. At step 300, the system can activate a contact manager. At step 302, the owner can ask the system add a new secondary layer environment. To add one or more contacts or contact groups, at step 304, the system can detect that the owner has selected a contact and communication form, which can be viewed by a third party user. The owner can accomplish this by tagging a contact group, as shown in FIG. 5A, or by tagging a contact name listed in the contact manager, as shown in FIG. 5B. At step 306, if the owner has tagged the desired contacts, contact groups, and communication forms, then, at step 308, the tagged information is saved and the selection of the contacts and communication forms that will be visible to a third party user is complete. However, if the owner would like to tag a second contact and communication form whose communication can be received by a third party user, then at step 310 the system can provide an option to the owner to create a new contact or tag an existing contact at step 312. If the contact and communication form to be added to this new secondary layer has not been inputted into the contact manager, then, at step 314, a new contact and communication form can be added to the contact manager and be tagged or selected. The new communication form can include any type of communication channel, such as SMS, e-mail, phone, Facebook, Twitter, WhatsApp., etc. At step 316, the system can then notify all communication channels, such as Facebook, WhatsApp, etc. of the new contact. This selection process can continue until all desired contacts have been added to the secondary layer.

Steps for Unselecting a Tagging a Contact

To delete or un-tag a contact or a contact group in a communication device or the secondary layer environment, the owner can, at step 300, go to the contact manager and, at step 320, un-select or un-tag a contact or a group of contacts. If only one contact or a group of contacts is needed to be removed from being visible to a third party user, then at step 322, the owner can answer "no" to the question "would you like to remove any additional contacts?" By pressing the button "no," then at step 324, the system can save the settings by the owner clicking on a save or done button. However, if the owner would like to continue un-tagging additional contacts or contact groups, then at step 326, the owner can request the system to remove further contacts or contact groups by un-tagging additional contacts or contact groups. The system then, at step 328, can notify all communication channels of the removed or untagged contact or contact groups. This un-tagging selection can continue until all desired contacts have been removed from the communication device or the secondary layer environment.

In another embodiment, the system can remove an entire secondary layer environment, by the owner simply deleting the secondary layer environment.

Steps Involved in Selecting a Pre-Existing Secondary Layered Environment

Figure 8:
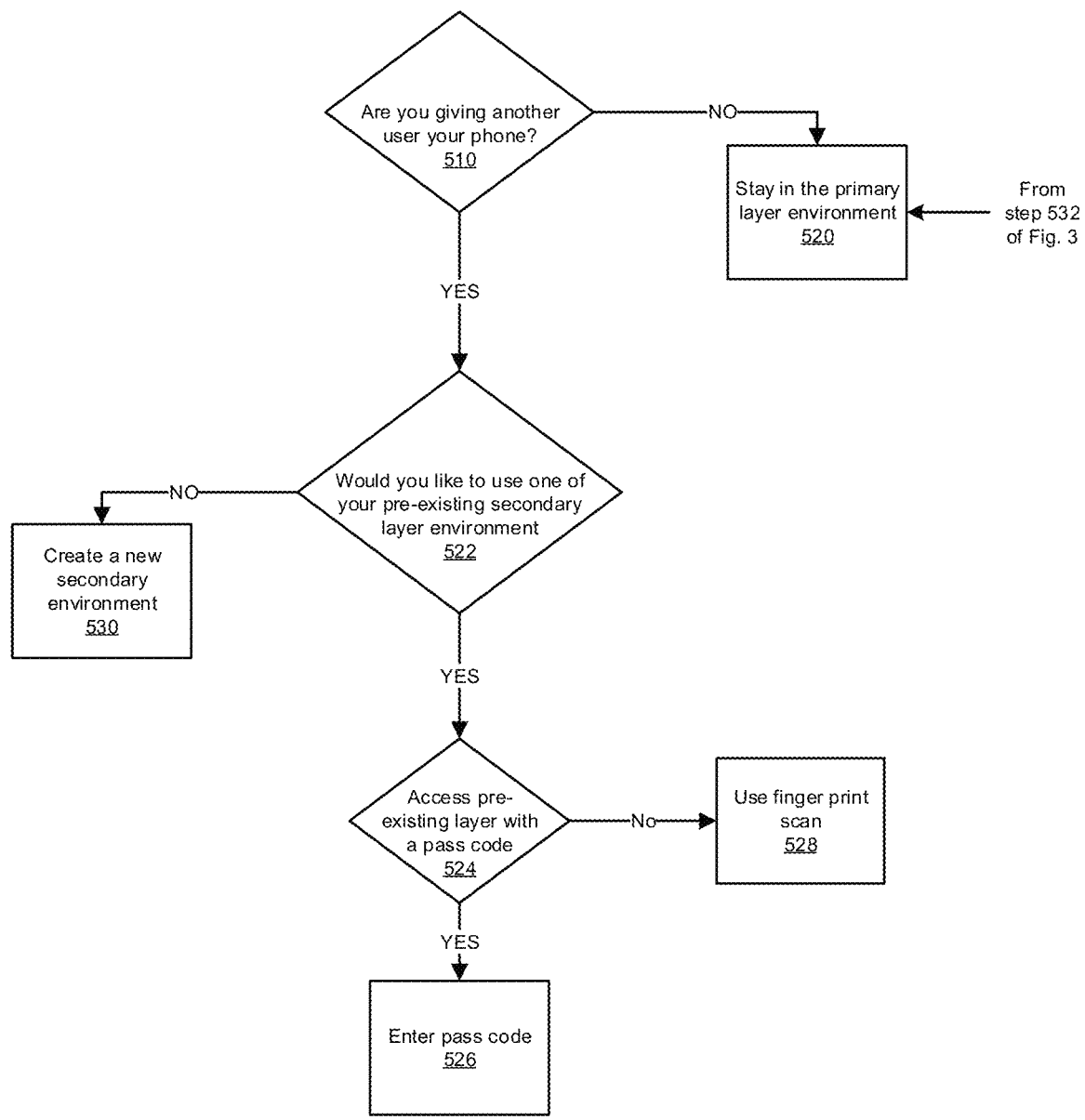
FIG. 8 is a flowchart showing how to select one of plurality of secondary layered environments, according to an example of the present disclosure.

The selection of one of the plurality of secondary layered environments is shown in FIG. 8. When the owner presses the security button that corresponds to selecting one of the plurality of secondary layered environments, at step 510, the system can generate a command to the processor to ask the owner if the owner is allowing a third party user to use the communication device. If the answer is "no," the security program, at step 520, generates a command to the processor that the security button was pressed by accident and asks the processor to keep the primary layered environment as the active layered environment. If the owner answers "yes," at step 522, the system can ask if the owner would like to use one of the pre-programmed secondary layered environments. If the answer is "yes," then at step 524, the system can ask if the owner would like to access a pre-existing layer with a pass code. If the answer to step 524 is yes, then the system, at step 526, can ask the owner to enter the pass code to allow the selection of one of the pre-existing secondary layered environments. However, if the answer to step 524 is "no," then the system, at step 528, can ask the owner to scan his or her finger print to enable selection of one of the pre-existing secondary layered environments. Alternatively, if the answer to step 524 is "no," then the system can be programmed such that the owner can view the pre-existing secondary layered environments without entering a pass code or scanning a finger print. In another example, if the answer to step 524 is "no," then the system may not allow the owner to view the pre-existing secondary layered environments without entering a passcode or scanning a finger print.

Steps Involved in Creating a New Secondary Layered Environment

Figure 9:
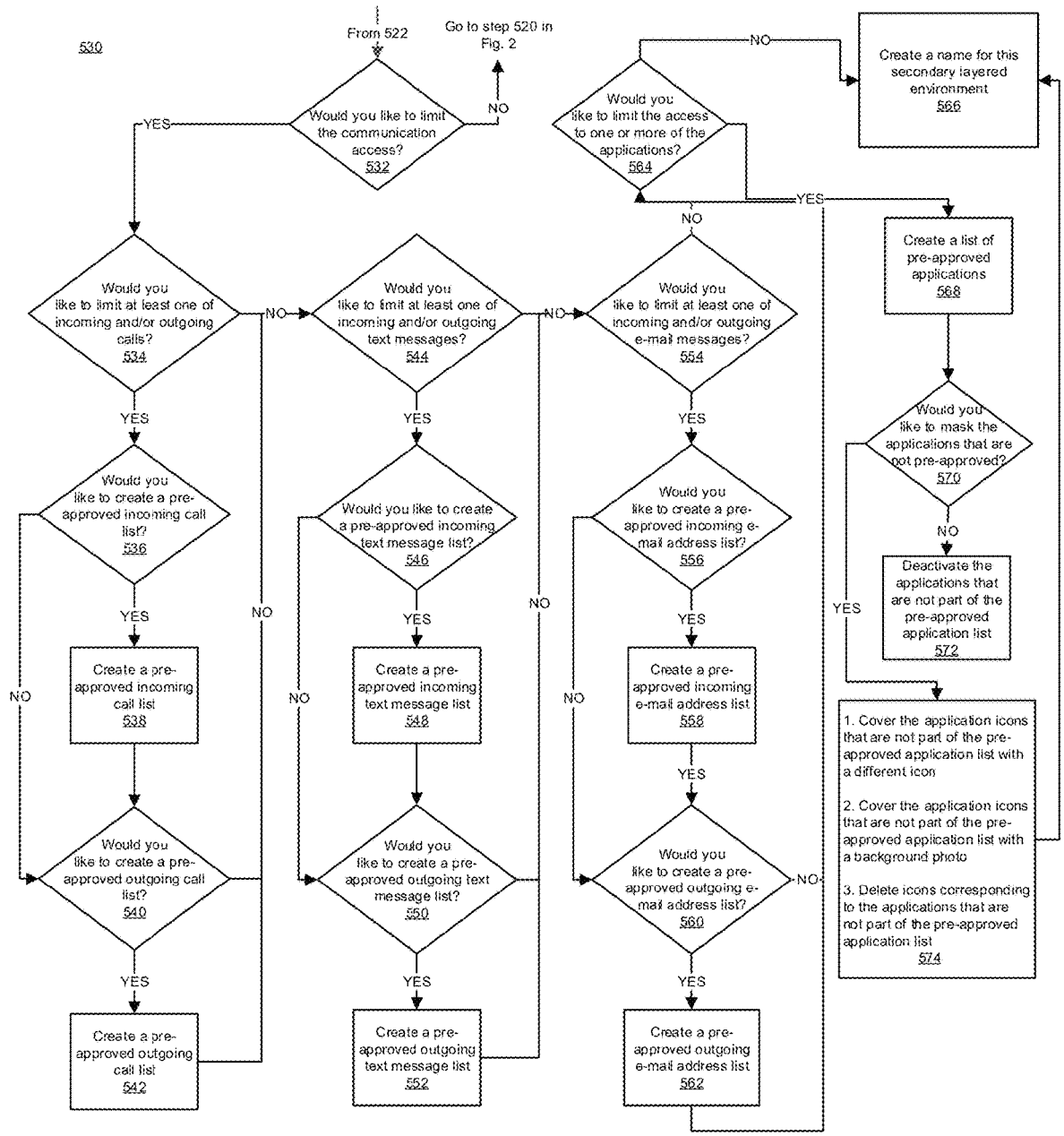
FIG. 9 is a flowchart showing how to create a new secondary layered environment, according to an example of the present disclosure.

If the owner answers "no," at step 522, the system can conclude that the owner would like to create a new secondary layered environment. The steps that can result in the creation of a new secondary layered environment is shown in FIG. 9.

Incoming Call List

To create a new secondary layered environment 530, the system, at step 532, asks the owner if the owner would like to limit the access to the communication device 100. If the owner answers "yes," at step 534, the system can ask the owner if the owner would like to limit at least one of the incoming and/or outgoing calls. If the owner answers "yes," at step 536, the system can ask the owner if the owner would like to create a pre-approved incoming call list to limit the incoming calls to only calls coming from the numbers associated with the pre-approved incoming call list. If the answer is "yes," then at step 538, a table appears for the owner to create a pre-approved incoming call list. Alternatively, the pre-approved list of incoming calls can be created as described above with respect to FIGS. 2-6.

Outgoing Call List

Once the pre-approved incoming call list has been completed, or the answer to the question presented at step 536 was "no," then the system, at step 540, asks the owner if the owner would like to create a pre-approved outgoing call list to limit the outgoing calls to only calls that are associated with the pre-approved outgoing call list. In an aspect, if the owner answers "yes," at step 542, a table can appear for the owner to create the pre-approved outgoing call list. Alternatively, the owner can tag contacts whose phone numbers are allowed to be dialed by a third party user. In an example, if the incoming call list is similar to the outgoing call list, the owner can have the option of simply copying and pasting the content of the table of incoming call list to the table of outgoing call list. In an example, the outgoing calls can be limited by only enabling the numbers on the dial pad that are associated with the list of approved outgoing call phone numbers. Once the pre-approved outgoing call list has been completed, or the answer to the question presented at steps 540 or 534 was "no," then the system, at step 544, can ask the owner if the owner would like to limit at least one of incoming and/or outgoing text messages.

Incoming Text Message List

In response to the question presented at step 544, if the owner answers "yes," at step 546, the system can ask the owner if the owner would like to create a pre-approved incoming text message list to limit the receipt of the incoming texts to only texts coming from the numbers associated with the pre-approved incoming text list. If the answer is "yes," then at step 548, a table can appear for the owner to create the pre-approved incoming text message list. Alternatively, the pre-approved list of incoming texts can be created as described above with respect to FIGS. 2-6. If the content in the table of incoming text list is the same as the content in the table of incoming call list or outgoing call list, the owner can copy and paste the content of the incoming call list or the outgoing call list into the incoming text message list table.

Outgoing Text Message List

Once the pre-approved incoming text list has been completed, or if the answer to the question presented at step 546 was "no," then the system, at step 550, can ask the owner if the owner would like to create a pre-approved outgoing text message list to limit the outgoing texts to only texts that are associated with the pre-approved outgoing text message list. In an aspect, if the owner answers "yes," at step 552, a table can appear for the owner to create the pre-approved outgoing text message list. In an example, if the incoming text message list, incoming call list, or outgoing call list is similar to the outgoing text message list, the owner can have the option of simply copying and pasting the content of the corresponding table to the table of outgoing text message list. In an example, the outgoing text can be controlled by limiting the "To" field by only enabling the numbers on the keypad that are associated with the list of approved outgoing text numbers.

In an aspect, the owner can limit the outgoing text messages to a predetermined number of text messages in a pre-determined amount of time to control the costs associated with sending text messages. For example, instead of and/or in addition to the list of numbers in the outgoing text message list, the owner can program the table so that a predetermined number of texts, for example only 5 texts, can be sent in a predetermined amount of time, for example, in an hour.

Once the pre-approved outgoing text message list, at step 552, has been completed, or if the answer to the questions presented at steps 550 or 544 was "no," then the system, at step 554, asks the owner if the owner would like to limit at least one of incoming and/or outgoing e-mail messages.

Incoming E-Mail List

If the answer to the question presented at step 554 is a "yes," then at step 556, the system can ask the owner if the owner would like to create a pre-approved incoming e-mail address list to limit the incoming e-mails to only e-mails coming from the e-mail addresses associated with the pre-approved incoming e-mail address list. If the answer is "yes," then at step 558, system can generate a table for the owner to create the pre-approved incoming e-mail address list. Alternatively, the pre-approved list of incoming e-mail list can be created as described above with respect to FIGS. 2-6.

If the table of incoming e-mail address list is the same as one of the table associated with incoming call list, outgoing call list, incoming text message list, or outgoing text message list, then the owner can copy and paste the content of the corresponding table into the incoming e-mail address list table.

Outgoing E-Mail List

Once the pre-approved incoming e-mail address list has been completed, or the answer to the question presented at step 556 was a "no," then the system, at step 560, can ask the owner if the owner would like to create a pre-approved outgoing e-mail address list to limit the outgoing e-mails to only e-mail addresses that are associated with the pre-approved outgoing e-mail address list. In an aspect, if the owner answers "yes," at step 562, the system can generate a table for the owner to create the pre-approved outgoing e-mail address list. In an example, if the incoming e-mail address list, incoming call list, outgoing call list, incoming text message list, or outgoing text message list is similar to the outgoing e-mail address list, the owner can have the option of simply copying and pasting the content of the corresponding table to the table of outgoing e-mail address list. In an example, the outgoing e-mail can be controlled by limiting the "To" field by only enabling the letters on the keypad that are associated with the email addresses on the approved outgoing email list.

Limiting Access to Applications

Once the pre-approved outgoing e-mail address list, at step 562, has been completed, or if the answer to the question presented at steps 560 or 554 was a "no," then the system, at step 564, can ask the owner if the owner would like to limit access to one or more of the applications. If the owner answers "no," then the system, at step 566, can ask the owner to create a name for this new secondary layered environment and to save this new secondary layered environment. Alternatively, if the owner has decided not to create a secondary layered environment, i.e., the owner answered "no" to the questions presented at steps 532, then the system can take the owner back to the primary layered environment of step 520 in FIG. 8.

Application List

In an aspect, if the owner answers "yes" to the question presented at step 564, at step 568, the system can generate a table for the owner to create the pre-approved application list that can be accessed in this newly created secondary layered environment. Once the pre-approved application list has been completed, at step 570, the system can ask the owner if the owner would like to mask the applications that are not part of the pre-approved application list. If the owner answers "no," at step 572, the system, for the purposes of this secondary layered environment, deactivates the applications that are not part of the pre-approved application list. If the owner answers "yes," at step 574, the system can provide the owner with the following choices: (1) cover the application icons that are not part of the pre-approved application list with a different icon, (2) cover the application icons that are not part of the pre-approved application list with a background photo, and (3) delete icons corresponding to the applications that are not part of the pre-approved application list. For each of the created secondary layered environment at step 566, the owner can program one or more of the options provided in step 574.

Incoming Call Protocol

Figure 10:
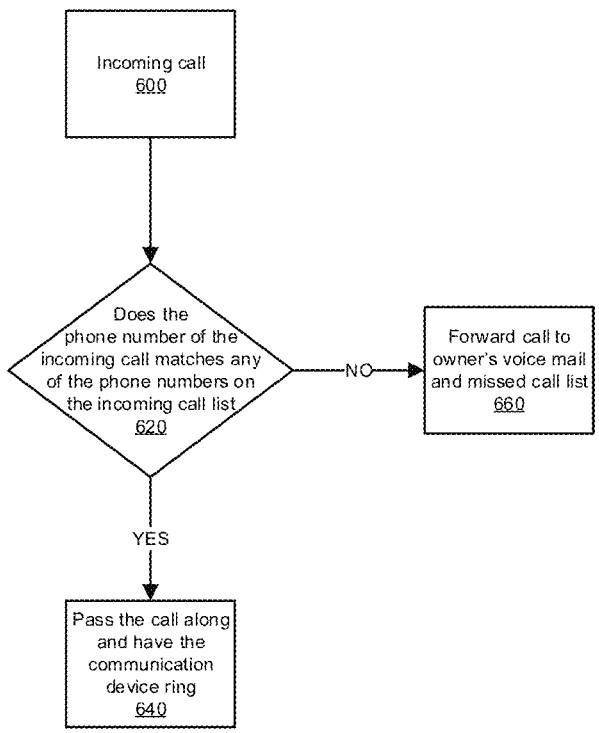
FIG. 10, is a flowchart showing how a phone call can be received in a secondary layered environment, according to an example of the present disclosure.

In an aspect, FIG. 10 is an exemplary protocol for an incoming call in a secondary layered environment. Referring to FIG. 10, at step 600, an incoming call can be received by the communication device. At step 620, a comparator can compare the phone number of the incoming call to the phone numbers in the approved incoming call list that was previously created. If the phone number of the incoming call list matches one of the phone numbers listed in the approved incoming call list, then, at step 640, the call is passed through and the communication device can inform the third party user (e.g., via phone ring, phone vibration, phone message, etc.) that a call is being received.

Incoming Call Log

If the phone number of the received/incoming call does not match one of the phone numbers listed in the approved incoming call list, then, at step 660, the call is passed to the owner's voice mail for the caller to, at the caller's option, leave the owner a voice mail. Additionally, the phone number of the caller can be registered in the missed call list, which can be accessible by the owner, in the primary layered environment, and not necessarily by the third party user, in the secondary layered environment.

Outgoing Call Protocol

Figure 11:
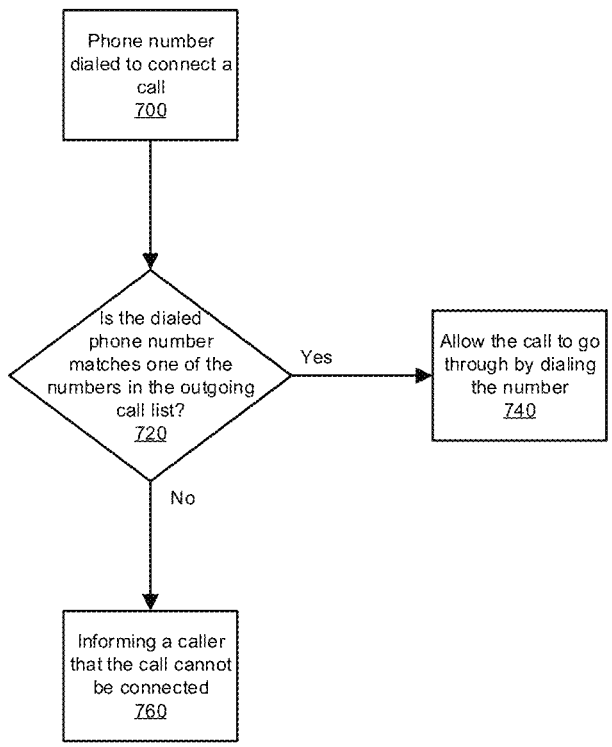
FIG. 11, is a flowchart showing how a phone call can be made in a secondary layered environment, according to an example of the present disclosure.

In an aspect, FIG. 11 is an exemplary protocol for an outgoing call in a secondary layered environment. Referring to FIG. 11, at step 700, a third party user dials a phone number to connect a call by, for example, entering a phone number and pressing the send button. Once the send button has been pressed, the dialed phone number can be compared to the approved outgoing call list previously created by the owner. At step 720, if the dialed phone number matches one of the phone numbers in the outgoing call list, then, at step 740, the dialed number is connected to the phone network and the call can go through. As stated above, in an example, the outgoing calls can be limited by only enabling the numbers on the dial pad that are associated with the list of approved outgoing call phone numbers.

Outgoing Call Log

At step 740, the phone number of the outgoing call is also registered in the outgoing call/dialed list. In an example, the missed call list in step 660 and the outgoing call/dialed list in step 740 can be in a single list that identifies which calls were missed or come-in while a third party user was on the phone and which calls were made by the third party user. In another example, the missed call list in step 660 and the outgoing call/dialed list in step 740 are two different lists. In each case, the missed calls and the outgoing calls can be viewed by the owner when the communication device is in the primary layered environment.

Restricted Outgoing Calls

At step 720, if the dialed phone number does not match one of the phone numbers in the outgoing call list, then, at step 760, the caller can be informed that the call cannot be connected. In an aspect, the caller can be informed, by a text message on the communication device's screen, that the call could not be connected. Additionally or alternatively, at step 760, the dialed phone number that was dialed but did not match one of the phone numbers in the approved outgoing call list, can be saved in an unconnected dialed numbers list. In an example, the unconnected dialed number list in step 760 and the outgoing call/dialed list in step 740 can be in a single list that identifies which calls were successfully made and which calls were dialed, but were not connected. In another example, the unconnected dialed number list in step 760 and the outgoing call/dialed list in step 740 are two different lists. In each case, the unconnected dialed numbers and the outgoing calls can be saved in a communication storage and be viewed by the owner when the communication device is in the primary layered environment.

Incoming Text

Figure 12:
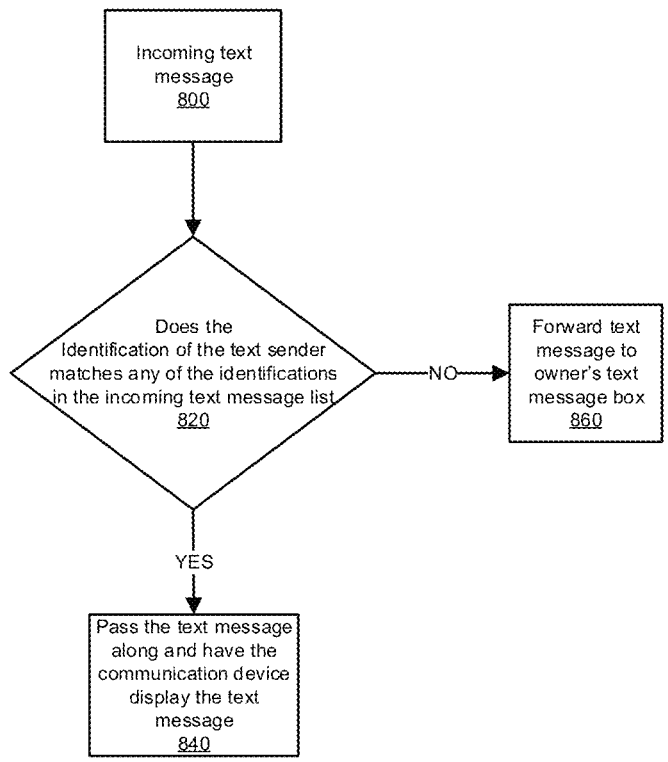
FIG. 12, is a flowchart showing how a text message can be received in a secondary layered environment, according to an example of the present disclosure.

FIG. 12 illustrates an exemplary protocol for an incoming text message in a secondary layered environment. Referring to FIG. 12, at step 800, an incoming text message is received by the communication device. At step 820, a comparator can compare the identification (e.g., phone number) of the text sender, for example, the phone number of the incoming text message, to the identifications (e.g., phone numbers) of the approved incoming text message list that was previously created by the owner. If the identification of the text message sender matches one of the identifications listed in the approved incoming text message list, then, at step 840, the text message is passed along and the communication device can inform the third party user and display the received text message. However, if the identification of the sender does not match one of the identifications in the approved incoming text message list, then, at step 860, the text message can be forwarded to the owner's text message box, which can be accessible by the owner, in the primary layered environment, and not necessarily by the third party user, in the secondary layered environment. In an example, the owner's text message box can only be accessed through the primary layered environment.

Outgoing Text

Figure 13:
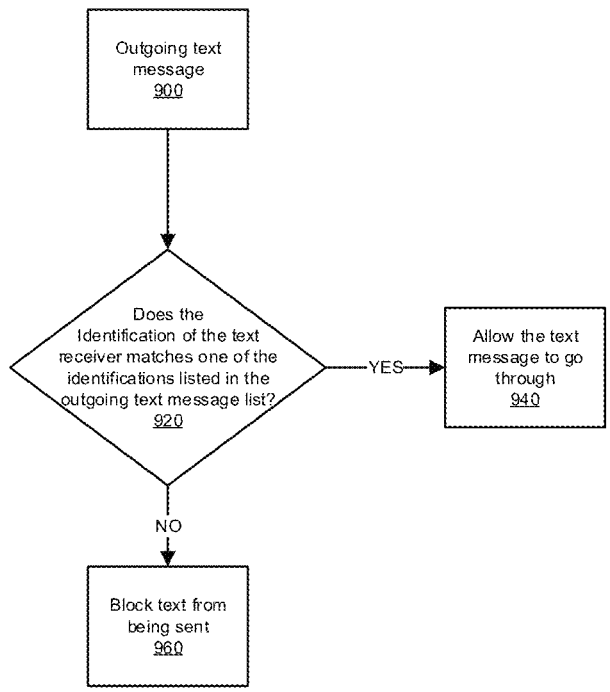
FIG. 13, is a flowchart showing how a text message can be sent in a secondary layered environment, according to an example of the present disclosure.

In an aspect, FIG. 13 is an exemplary protocol for an outgoing text message in a secondary layered environment. Referring to FIG. 13, at step 900, a third party user can draft a text message and press the send button to transmit the drafted text. Once the send button has been pressed, at step 920, a comparator can compare the identification of the text receiver to the identifications in the approved outgoing text message list that was previously created by the owner. If the identification of the text message receiver matches one of the identifications in the approved outgoing text message list, then, at step 940, the text message is sent out. However, if the identification of the text message receiver does not match one of the identifications in the approved outgoing text message list, then, at step 960, the text message is blocked from being sent. In an aspect, a copy of the draft text message can be placed in the owners draft message box. In an aspect, a third party user can receive a message stating that the text was not sent.

In an aspect, at step 960, a copy of the draft text message can be automatically saved in a draft text message box. The draft text message box can be accessed in the primary layered environment. In one example, prior to sending a text, the communication device can inform the sender that a copy of the draft text message will be saved.

In another aspect, not shown in the Figs., when the owner does not want the third party user to text more than a predetermined number of texts in a predetermined amount of time, then when the third party user presses the sent text message button, a clock starts to run to keep track of laps time. In addition, the communication device can keep track of the number of times that the sent button was pressed. If the number of times that the text message sent button was pressed in a predetermined amount of time matches the maximum number of allowed text messages to be sent in a predetermined amount of time, then the next text message can be blocked from being sent until the predetermined amount of time has passed. In an example, the third party user can receive a message stating that the third party user has reached the maximum number of allowed text messages that can be sent in an hour or any other predetermined amount of time. In another example, the third party user can receive a message that is generic and does not allow the third party user to realize that the communication device is functioning in a secondary layered environment. For example, the message can state that "the communication device was unable to connect to the network, please try again at another time."

Incoming E-Mail

Figure 14:
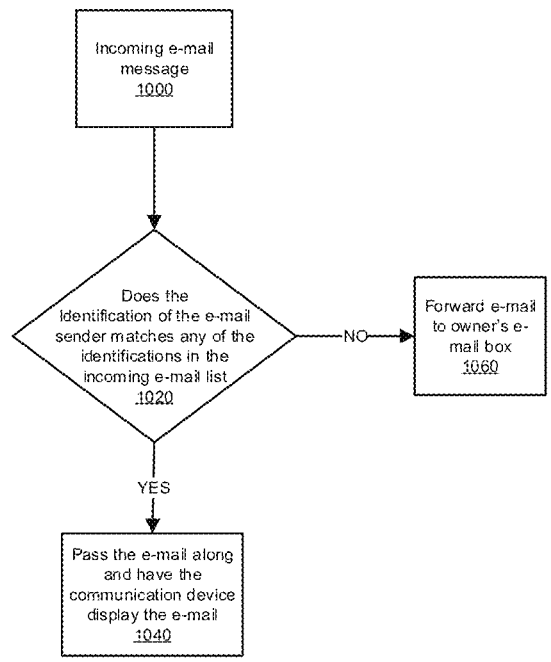
FIG. 14, is a flowchart showing how an e-mail can be received in a secondary layered environment, according to an example of the present disclosure.

In an aspect, FIG. 14 is an exemplary protocol for an incoming e-mail in a secondary layered environment. Referring to FIG. 14, at step 1000, an incoming e-mail is received by the communication device. At step 1020, a comparator can compare the identification of the e-mail sender, for example, the e-mail address of the incoming e-mail, to the identifications (e.g., e-mail addresses) of the approved incoming e-mail list that was previously created by the owner. If the identification of the sender matches one of the identifications in the approved incoming e-mail list, then, at step 1040, the e-mail is passed along and the communication device can inform the third party user and display the received e-mail. However, if the identification of the sender does not match one of the identifications in the approved incoming e-mail list, then, at step 1060, the e-mail can be forwarded to owner's e-mail box, which is accessible by the owner but not necessarily by the third party user. In an example, the owner's e-mail box can only be accessed through the primary layered environment.

Outgoing E-Mail

Figure 15:
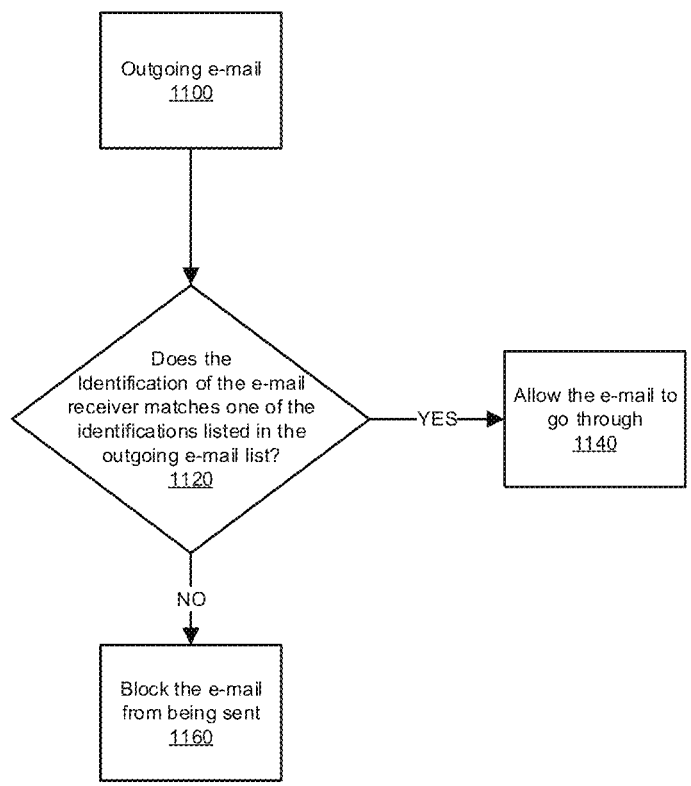
FIG. 15, is a flowchart showing how an e-mail can be sent in a secondary layered environment, according to an example of the present disclosure.

In an aspect, FIG. 15 is an exemplary protocol for an outgoing e-mail in a secondary layered environment. Referring to FIG. 15, at step 1100, a third party user drafts an e-mail and presses the send button to transmit the e-mail. Once the send button has been pressed, at step 1120, the identification of the e-mail receiver can be compared to the identifications listed in the approved outgoing e-mail list that was previously created by the owner to determine whether the identification of the e-mail (e.g., e-mail address of the receiver) matches any of the identifications (e.g., e-mail addresses) listed in the approved outgoing e-mail list. If the identification of the e-mail receiver matches one of the identifications listed in the approved outgoing e-mail list, then, at step 1140, the e-mail is sent out. However, if the identification of the e-mail receiver does not match one of the identifications listed in the approved outgoing e-mail list, then, at step 1160, the e-mail is blocked from being sent. In an aspect, a copy of the draft e-mail can be placed in the owners draft e-mail box. In an aspect, the third party user can receive a message stating that the e-mail was not sent.

In an aspect, at step 1160, a copy of the draft e-mail can be automatically saved in a draft e-mail box. The draft e-mail box can be accessed in the primary layered environment. In one example, prior to sending an e-mail, the communication device can inform the sender that a copy of the draft e-mail will be saved.

Message to a Third Party User

In each of the embodiments described above, each of the secondary layered environments can be programmed such that a third party user is unable to realize that the communication device is functioning in the secondary layered environment. In one example, when the third party user is unable to perform a function, the communication device can send a message such as "the device is unable to connect to the network, please try again at a later time." In one example, the owner of the communication device can program each of the secondary layered environments to display a specific message that is specifically designed for that particular secondary layered environment.

Summary Log

In an aspect, a copy or a list of each activity that took place while the communication device was in a secondary layered environment can be available in the primary layered environment. For example, if a call, text, or e-mail, was made, missed, or received while in a secondary layered environment, the owner can review these information in a log section of the primary layered environment. In an aspect, the details of each information are also available for review. For example, the duration of the call made or received and/or a copy of the text or e-mail that was sent or received. In one example, a recording of the call can also be available.

Communication Device Synced with an Accessory

In an aspect, the owner of the communication device may want to have an active primary layered environment, when the communication device is synced to an accessory, such as a smart watch. Furthermore, the owner, for security purposes, may want to have an active secondary layered environment, when the communication device is not synced to the accessory.

Figure 16:
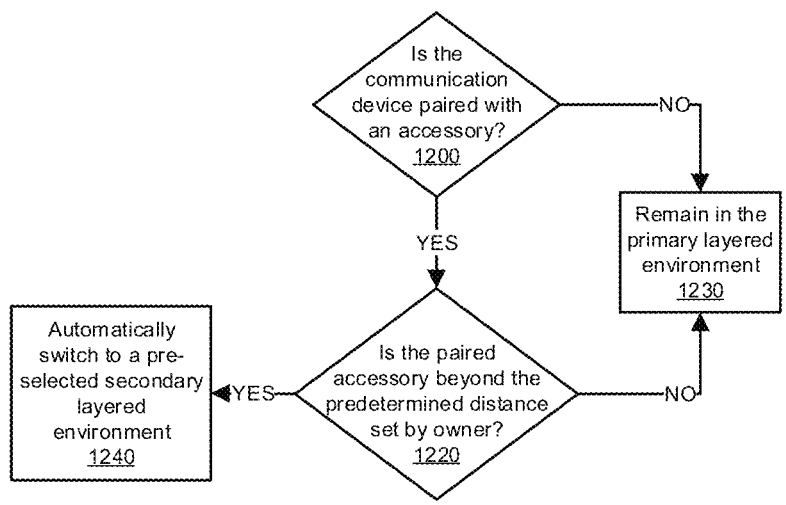
FIG. 16, is a flowchart showing protocol to have a primary layered environment when the communication device and an accessory are synced and a secondary layered environment when the communication device and the accessory are not synced, according to an example of the present disclosure.

FIG. 16 illustrates an exemplary protocol to have a primary layered environment when the communication device and an accessory are synced and to have a secondary layered environment when the communication device and the accessory are not synced. At step 1200, the security program determines if the communication device is paired/synced with an accessory, such as a smart watch. If the security program determines that the accessory is synced, then the security program, at step 1220, can determine if the paired accessory is beyond the predetermined distance set by the owner. If the paired accessory is beyond the predetermined distance that was set by the owner, then at step 1240, the security program can automatically switch to a preselected secondary environment. However, if the communication device is not paired with an accessory, at step 1200, or if the paired accessory is within the predetermined distance set by the owner at step 1220, then the communication device, at step 1230, will remain in the primary layered environment.

In an example, the owner can program the communication device, such that the communication device and the accessory are only synced when they are less than a predetermined distance away from one another. In an example, the owner can choose between a predetermined plurality of distances. In another example, the owner can actually instruct the communication device to un-sync itself if it is a predetermined distance away from the accessory. In this particular embodiment, both the communication device and the accessory may include a GPS so that the communication device can determine the distance between it and the accessory. In another example, instead of a GPS or in addition to having a GPS, the communication device can determine the distance between it and the accessory by cellular tower triangulation.

In an aspect, after a predetermined amount of time, for example, every 1 second (s), 5 s, 10 s, 20 s, 30 s, 40 s, 50 s, 1 min, 2 min, or more time, the system continues to check to confirm that the communication device and the accessory are synced/paired. If it is determined that the communication device and the accessory are beyond the predetermined distance set by the owner, at step 1240, the system, automatically, changes the primary layered environment to a pre-determined secondary layered environment. Once the communication device is in the secondary layered environment, the security software can continually check to determine if the communication device and the accessory are not synced. If the communication device and the accessory are within the predetermined distance set by the owner, then at step 1230, the security software can automatically switch from a secondary layered environment to a primary layered environment. If they are beyond the predetermined distance set by the owner, then the communication device can stay and operate in the secondary layered environment. Alternatively and/or additionally, the owner can switch between different layers at any time.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

This scope disclosure is to be broadly construed. It is intended that this disclosure disclose equivalents, means, systems and methods to achieve the devices, activities, computer, and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this device can be dynamic in its use and operation, this disclosure is intended to encompass the equivalents, means, systems and methods of the use of the device and/or article of manufacture and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. A communication device comprising:
   a memory to store a primary layered environment and a plurality of secondary layered environments, wherein the plurality of secondary layered environments comprise different communication enabled criteria and different application criteria;
   a processor to:
      receive a selection of a secondary layered environment from the plurality of secondary layered environments;
      determine communication enabled criteria and application criteria associated with the selected secondary layered environment;
      determine an enabled communication list associated with the communication enabled criteria for the selected secondary layered environment;
      determine an active application list associated with the application criteria for the selected secondary layered environment;
      switch from the primary layered environment to the selected secondary layered environment upon separation of the communication device from a synced accessory by a predetermined distance;
      receive an incoming communication transmitted to the communication device;
      determine identification information from the incoming communication;
      determine if the identification information from the incoming communication is a contact on an enabled communication list for the selected secondary layered environment, wherein the contact on the enabled communication list is copied and pasted or otherwise provided from the primary layered environment to the selected secondary layered environment;
      if the identification information from the incoming communication is a contact on the enabled communication list, display the incoming communication;

if the identification information from the incoming communication is not a contact on the enabled communication list, do not display the incoming communication; and
allow communication with applications in the active application list; and
a screen to display the selected secondary layered environment.

2. The communication device of claim 1, wherein the memory further stores a tagged communication form of tagged contacts and the processor compares the determined identification information to the tagged communication form of the tagged contacts.

3. The communication device of claim 2, wherein the incoming communication corresponding to the tagged communication form of the tagged contacts is viewable by a third party user.

4. The communication device of claim 1, wherein at a default setting, all contacts and communication forms are tagged and are viewable, wherein to prevent a third party user from viewing a pre-selected number of contacts and communication forms, the pre-selected contacts and communication forms need to be untagged.

5. The communication device of claim 1, wherein at a default setting, all contacts and communication forms are untagged and are not viewable, wherein to allow an owner to view the contacts and communication forms, the contacts and communication forms need to be tagged.

6. A non-transitory computer readable medium storing machine readable instructions executable by a processor to:
receive a selection of a secondary layered environment from a plurality of stored secondary layered environments;
determine communication enabled criteria and application criteria associated with the selected secondary layered environment;
determine an enabled communication list associated with the communication enabled criteria for the selected secondary layered environment;
determine an active application list associated with the application criteria for the selected secondary layered environment;
switch from the primary layered environment to the selected secondary layered environment upon separation of a synced accessory by a predetermined distance from a communication device operable to display the primary layered environment and the selected secondary layered environment;
receive an incoming communication transmitted to the communication device;
determine identification information from the incoming communication;
determine if the identification information from the incoming communication is a contact on an enabled communication list for the selected secondary layered environment,
wherein the contact on the enabled communication list is copied and pasted or otherwise provided from the primary layered environment to the selected secondary layered environment;
if the identification information from the incoming communication is a contact on the enabled communication list, display the incoming communication;
if the identification information from the incoming communication is not a contact on the enabled communication list, not display the incoming communication; and
allow communication with applications in the active application list.

7. The non-transitory computer readable medium of claim 6, wherein the primary layered environment includes a contact list.

8. The non-transitory computer readable medium of claim 6, wherein the selected secondary layered environment includes an approved communication form including the enabled communication list, and the processor compares the determined identification information to the approved communication form.

9. The non-transitory computer readable of claim 8, wherein the enabled communications list is created by tagging one or more contacts and communication forms in the primary layered environment.

10. The non-transitory computer readable of claim 8, wherein incoming communications corresponding to the approved communication form are viewable by a third party user.

11. The non-transitory computer readable of claim 10, wherein to determine if previously stored communications should be viewable by the third party user, the processor compares identification information from the previously stored communications to the approved communication form, and if a match is found, the processor makes the previously stored communications corresponding to the approved communication form visible to the third party user.

12. The non-transitory computer readable of claim 6, wherein the selected secondary layered environment is accessed by a passcode.

13. A communication device comprising:
a memory to store a plurality of secondary layered environments, wherein the plurality of secondary layered environments comprise different communication enabled criteria and different application criteria;
a processor to:
receive a first selection of the plurality of secondary layered environments stored in the memory;
determine communication enabled criteria and application criteria associated with the first selection of the plurality of secondary layered environments;
determine an enabled communication list associated with the communication enabled criteria for the first selection of the plurality of secondary layered environments;
determine an active application list associated with the application criteria for the first selection of the plurality of secondary layered environments
wherein the communication device is to:
switch to the first selection of the plurality the secondary layered environments upon separation of the communication device from a synced accessory by a predetermined distance;
at least one of receive and send communications from and to a number of contacts on the enabled communication list,
wherein to receive a communication, the communication device is to:
receive an incoming communication transmitted to the communication device;
determine identification information from the incoming communication;
determine if the identification information from the incoming communication is a contact on the enabled communication list, wherein the contact on the enabled communication list is copied and pasted or otherwise provided from a primary layered environment to the secondary layered environment of the first selection;
if the identification information from the incoming communication is a contact on the enabled communication list, display the incoming communication; and
if the identification information from the incoming communication is not a contact on the enabled communication list, not display the incoming communication; and
communicate with applications in the active application list; and
a screen to display the first selection of the plurality the secondary layered environments.

14. The communication device of claim 13, wherein the stored plurality of secondary layered environments is configured to at least one of (i) control access to at least a predetermined portion of the communication device, (ii) control functionality of at least a predetermined number of functions of the communication device, and (iii) mask at least one of programs and features of the communication device.

15. The communication device of claim 13, wherein the enabled communication list comprises at least one of (i) a pre-approved incoming call list, (ii) a pre-approved outgoing call list, (iii) a pre-approved incoming text list, (iv) a pre-approved outgoing text recipient list, (v) a pre-approved incoming email list, (vi) a pre-approved outgoing e-mail recipient list.

16. The communication device of claim 15, wherein if an incoming call matches the pre-approved incoming call list associated with the first selection of the plurality of secondary layered environments, the incoming call is passed through for a answering and if the incoming call does not match the pre-approved incoming call list associated with the first selection of the plurality of secondary layered environments, the incoming call is diverted to an owner voice mail.

17. The communication device of claim 15, wherein if an incoming text matches the pre-approved incoming text list associated with the first selection of the plurality of secondary layered environments, the incoming text is passed through for viewing and if the incoming text does not match the pre-approved incoming text list associated with the first selection of the plurality of secondary layered environments, the incoming text is diverted to an owner text.

* * * * *